United States Patent
Turner

(10) Patent No.: US 11,127,971 B2
(45) Date of Patent: Sep. 21, 2021

(54) BATTERY PLATE LOADING MECHANISM

(71) Applicant: TBS ENGINEERING LIMITED, Gloucester (GB)

(72) Inventor: Nigel Turner, Gloucester (GB)

(73) Assignee: TBS ENGINEERING LIMITED, Gloucester (GB)

( * ) Notice: Subject to any disclaimer, the term of this patent is extended or adjusted under 35 U.S.C. 154(b) by 103 days.

(21) Appl. No.: 16/563,140

(22) Filed: Sep. 6, 2019

(65) Prior Publication Data

US 2020/0091542 A1  Mar. 19, 2020

(30) Foreign Application Priority Data

Sep. 14, 2018  (GB) ..................................... 1815043

(51) Int. Cl.
  *H01M 10/04*  (2006.01)
  *B25J 15/00*  (2006.01)
  *B65G 61/00*  (2006.01)
  *H01M 10/14*  (2006.01)

(52) U.S. Cl.
  CPC ..... *H01M 10/0404* (2013.01); *B25J 15/0028* (2013.01); *B65G 61/00* (2013.01); *H01M 10/14* (2013.01)

(58) Field of Classification Search
  CPC combination set(s) only.
  See application file for complete search history.

(56) References Cited

U.S. PATENT DOCUMENTS

| 2,454,100 | A | * | 11/1948 | Slayter | H01M 50/44 |
| | | | | | 429/144 |
| 3,982,624 | A | * | 9/1976 | Eberle | H01M 10/14 |
| | | | | | 198/418.3 |
| 4,168,772 | A | * | 9/1979 | Eberle | H01M 10/14 |
| | | | | | 198/418.3 |

(Continued)

FOREIGN PATENT DOCUMENTS

GB  2545180 A  6/2017

OTHER PUBLICATIONS

Search Report for Application No. GB1815043.3 dated Mar. 14, 2019.

(Continued)

*Primary Examiner* — Kyle O Logan
(74) *Attorney, Agent, or Firm* — Marshall, Gerstein & Borun LLP

(57) ABSTRACT

A battery plate loading system includes a battery plate separator apparatus having a work surface for receiving a stack of battery plates, and a loading mechanism including an arm coupled to the work surface. The arm is pivotable to move the work surface between a substantially horizontal position and a substantially vertical position. A pallet has a surface arranged to receive a plurality of stacks of battery plates, each stack being arranged in at least a first or a second orientation; and, a robot head arrangement configured to transfer stacks of battery plates from the pallet to the battery plate separator apparatus. The robot head arrangement includes a sensor configured to detect the orientation of each stack. The pivotable arm is configured to move the work surface to the substantially horizontal position or to the substantially vertical position in response to the detected orientation of a selected stack.

19 Claims, 8 Drawing Sheets

(56) References Cited

U.S. PATENT DOCUMENTS

| | | | |
|---|---|---|---|
| 4,664,581 A | 5/1987 | Matthews | |
| 5,376,477 A * | 12/1994 | Aidman | H01M 50/449 |
| | | | 429/141 |
| 5,616,434 A * | 4/1997 | Redden | B29C 66/727 |
| | | | 429/136 |
| 7,246,696 B2 * | 7/2007 | Hopwood | H01M 10/0413 |
| | | | 198/431 |
| 8,172,071 B2 | 5/2012 | Schafer | |
| 2005/0226711 A1 * | 10/2005 | Schnoor | B65G 47/917 |
| | | | 414/736 |
| 2018/0366766 A1 * | 12/2018 | Barge | H01M 10/14 |

OTHER PUBLICATIONS

Search Report for European Application No. 19195446.0, dated Feb. 10, 2020.
Intention to Grant European Application No. 19195446.0 dated Jan. 18, 2021.

* cited by examiner

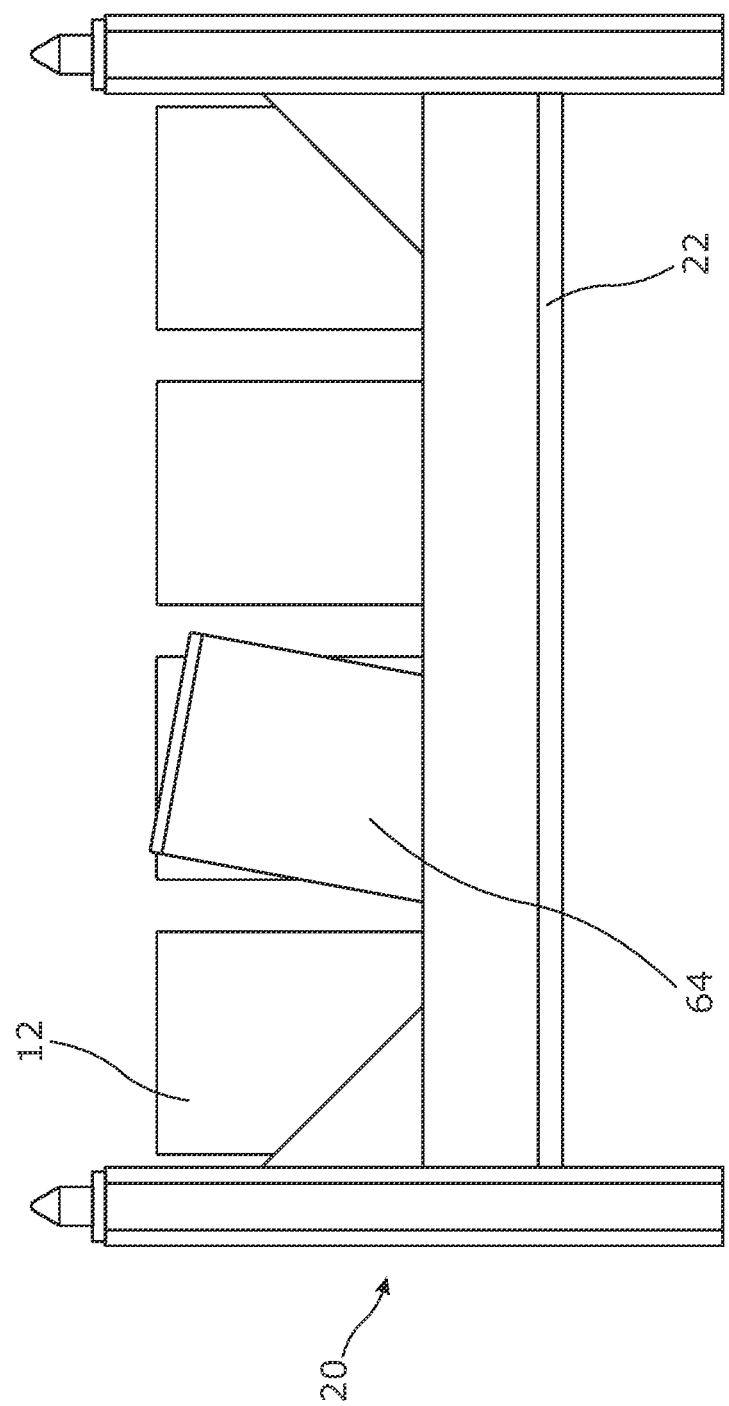

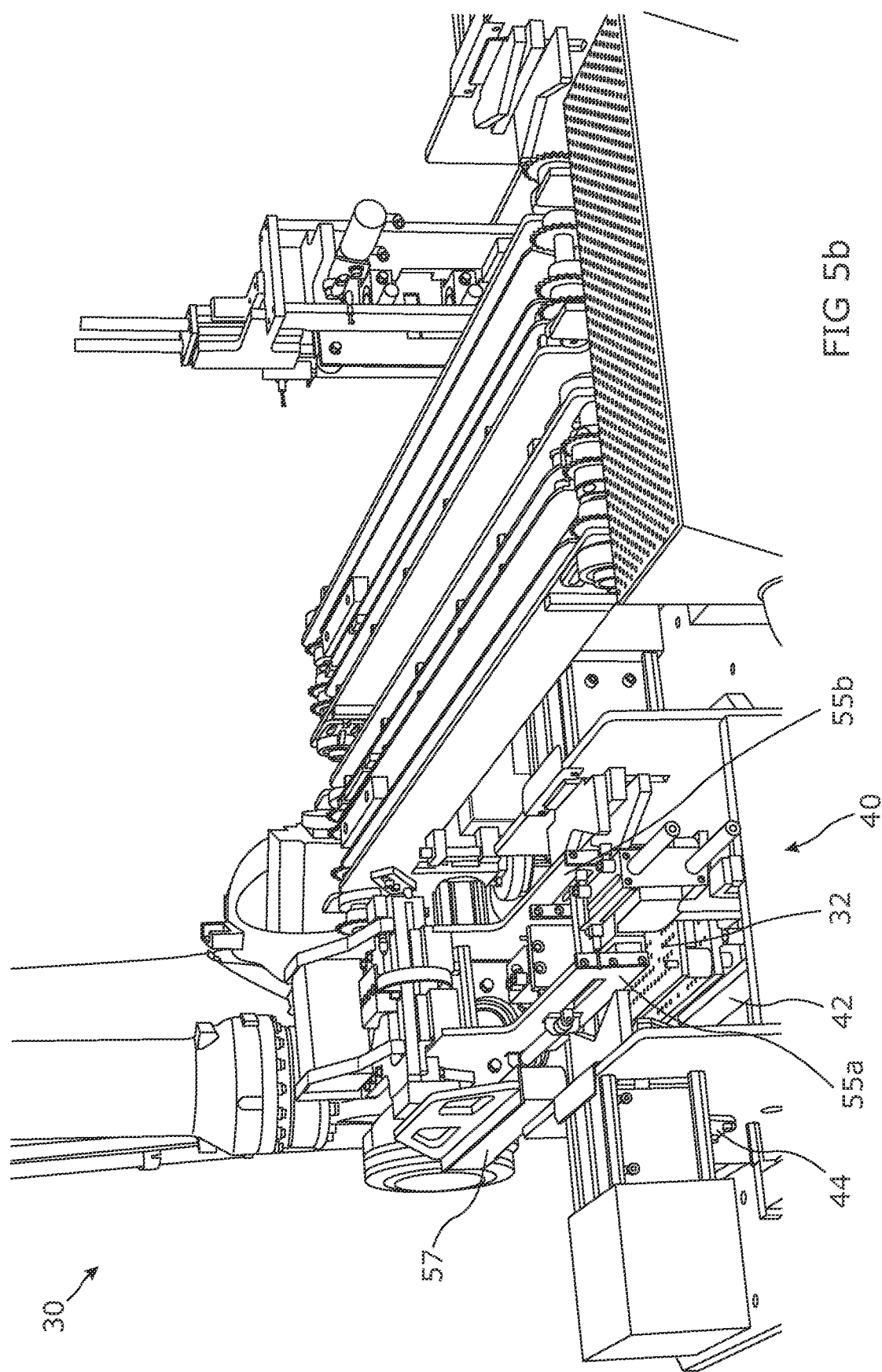

BATTERY PLATE LOADING MECHANISM

FIELD OF INVENTION

The present invention relates to a system and method for loading battery plates into a battery plate separator apparatus.

BACKGROUND TO THE INVENTION

The term "battery" is used herein to include accumulators. In a conventional lead-acid battery it is customary to connect together the plates of each stack by means of a lead strap or post which is fixed to aligned lugs or tabs on the plates.

In the manufacture of batteries, particularly for example lead acid batteries, battery plates are manufactured by known methods, formed into stacks or groups and then dried or cured. As a result of the drying or curing process, adjacent plates in the stacks (groups) may become stuck or bonded together.

Following plate production and curing, each individual plate is encased in an envelope or wrapper before the plates are placed in the battery casing. Alternatively, a separator layer may be placed between adjacent plates. In the case of enveloping, this is generally an automated process, carried out in an enveloping machine which takes individual plates one at time from a stack and places each one in an envelope or wrapper. If adjacent plates are stuck or bonded together it can be difficult or impossible for the enveloping machine to pick up a single plate.

To overcome this problem, an operator has to manually separate the plates prior to loading the plate stack in the post processing apparatus, for example prior to loading onto a conveyor for onward transport to the enveloping machine. The operator must first pick up each battery plate stack and drop it onto a conveyor belt, or other work surface, so that the lower edges of the plates impact the work surface. This impact breaks some of the bonds. The operator then manually manipulates the stack of so that the plates move relative to each other which further separates adjacent plates. The operator must then form the plates into a neatly aligned stack for further processing.

The manual plate separation or plate breaking is physically demanding work for the operator because each stack of plates can weigh in excess of 8 kg. Medium to long term working in such a role can lead to repetitive stress injuries.

Further, the lead plates are coated in lead oxide paste, and each time that the plates are manipulated, particularly when they are impacted on a work surface, particles of lead oxide dust are released into the air. Naturally operators working in such an environment are generally provided with suitable Personal Protective Equipment such as masks and eye protection. However, there is still an inherent risk to health and safety working in such an environment.

Embodiments of the invention seek to provide apparatus which overcome some of these problems.

SUMMARY OF THE INVENTION

Accordingly, in one aspect, the present invention provides a battery plate loading system, the system comprising:
a battery plate separator apparatus, the apparatus comprising:
a work surface for receiving a stack of battery plates; and,
a loading mechanism comprising an arm coupled to the work surface; the arm being pivotable around an axis to move the work surface between a substantially horizontal position and a substantially vertical position;
a pallet comprising at least one surface arranged to receive a plurality of stacks of battery plates, each stack being arranged in at least a first or a second orientation; and,
a robot head arrangement configured to transfer stacks of battery plates from the pallet to the battery plate separator apparatus;
wherein the robot head arrangement comprises a sensor configured to detect the orientation of each stack on the pallet prior to the transfer of each stack to the battery plate separator apparatus; and,
wherein the pivotable arm is configured to move the work surface to the substantially horizontal position or to the substantially vertical position in response to the detected orientation of a selected stack to be transferred.

The present invention provides a system which detects the orientation of the stacks of battery plates on a pallet, and then subsequently decides which position (i.e. vertical or horizontal) the work surface of the separator apparatus needs to be in, and moves the work surface into this position before loading the stack.

When stacks leave the battery plate separator apparatus, it is important that they are all in the same orientation before being processed further, such as enveloping or casting on a strap. It is therefore beneficial to load all stacks into the separator apparatus in the same orientation, so that they are all in the correct orientation for further processing.

Previously, the stacks were either re-oriented to a particular orientation by hand, which as mentioned above is dangerous and poses a health and safety risk. Other solutions include moving any incorrectly oriented stacks from the pallet to a turnover unit, whereby a robot arm would re-orient the stack before placing it back onto the pallet in the correct orientation, or loading it straight into the separator apparatus.

Advantageously, the system of the present invention is highly automated, and provides a safer and more compact solution for loading stacks of battery plates into the separator apparatus. Furthermore, the present system does not deem any stacks to be "incorrectly" oriented, but recognises when a stack is in a different orientation, and adjusts the position of the separator apparatus accordingly in order to accommodate these different stack orientations.

Furthermore, the system also recognises when a stack is misaligned on the pallet, such that an operator can intervene to correctly align the affected stack, before the stack is loaded into the separator apparatus.

Each stack of battery plates can comprise a plurality of aligned tabs. The tabs can be located on an edge of each stack. The location of the tabs can be used to identify the orientation of each stack of battery plates. The sensor can also detect the location of the aligned tabs on each stack.

The sensor can be a three-dimensional camera, which creates a digital image of the stacks on the pallet. The sensor can detect the presence or position of a stack of plates, and/or the location of the tabs on each plate. The sensor can be an optical sensor or a vision system. The sensor can identify at least one datum point on the pallet. The sensor can identify an edge or corner of the pallet. The sensor can use the datum point to determine alignment and/or position of the stack or stacks of plates on the pallet.

The system can further comprise a control module. The sensor can be configured to send data regarding the detected position of each stack of plates and/or the location of their respective tabs to the control module. The control module can download the data from the sensor. The orientation of each stack can be noted and displayed on a screen, such as a computer screen. The control module can analyse the data readings, and determine whether the pivotable arm must move the work surface to the substantially vertical position or substantially horizontal position in order to receive a chosen stack in the desired orientation (that is, with the tabs in a desired orientation). The determination stage can be carried out by a computer algorithm. A signal can then be automatically sent to the separator apparatus, which instructs the pivotable arm to move the work surface into the required position (i.e., the vertical or horizontal position).

If the sensor detects that the selected stack to be transferred is in the first orientation based on the location of the tabs, then the control module can automatically send a signal to the pivotable arm, which instructs the pivotable arm to move the work surface to the substantially horizontal position. Alternatively, if the sensor detects that the selected stack to be transferred is in the second orientation based on the location of the tabs, then the control module can automatically send a signal to the pivotable arm, which instructs the pivotable arm to move the work surface to the substantially vertical position.

The robot head arrangement can be configured to load each stack of battery plates into the battery plate separator apparatus. After determining the location and orientation of each stack, the robot head arrangement can be configured to pick up the selected stack from the pallet, and transfer the stack to the battery plate separator apparatus, which has been positioned accordingly.

The pallet can comprise a surface including at least one indicator for the alignment of the or each stack of plates. The pallet can have pre-designated positions for stacks indicated on the pallet surface. The pre-designated positions can be different for different types/sizes of plates making up the stack. The stacks can be located on the pallet at a pre-defined distance away from adjacent stacks.

The robot head arrangement can include at least one gripper mechanism configured to pick up a stack of battery plates. The pre-defined distance between stacks on the pallet can be wide enough to accommodate at least a portion of the gripper mechanism around the stack. The gripper mechanism can comprise a pair of elongate and opposed gripping jaw members arranged in a substantially parallel alignment, and an actuator for displacing at least one of the gripper jaw members towards the opposing jaw member.

The provision of the loading mechanism can allow the selected stack to be either top-loaded or side-loaded into the battery plate separator apparatus, depending on the detected orientation of the stack. When top-loading, the pivotable arm moves the work surface into the substantially horizontal position, and the stack of battery plates are positioned above the work surface. When side-loading, the pivotable arm moves the work surface into the substantially vertical position, and the stack of battery plates are positioned next to the work surface.

If the pivotable arm moves the work surface to the substantially vertical position in response to the detected orientation of a selected stack to be transferred, the pivotable arm may then be configured to move the work surface from the substantially vertical position to the substantially horizontal position once the robot head arrangement has loaded the stack of battery plates.

The battery plate separator apparatus can be provided with two loading mechanisms and two work surfaces. Each loading mechanism can be provided with a respective pivotable arm. Each loading mechanism can be moved simultaneously or sequentially.

The system can further comprise a supply mechanism for transferring a separated stack of plates for subsequent processing, for example to a plate enveloping apparatus. The pivotable arm can be configured to move the work surface to the substantially vertical position to allow the separated stack of plates to be unloaded/removed from the apparatus and transferred to the supply mechanism. The supply mechanism can be a conveyor belt.

Accordingly, in a second aspect, the present invention provides a method of loading battery plates into a battery plate separator apparatus, the apparatus comprising:
    a work surface for receiving a stack of battery plates; and,
    a loading mechanism comprising an arm coupled to the work surface; the arm being pivotable around an axis to move the work surface between a substantially horizontal position and a substantially vertical position;
the method comprising:
    a) detecting the orientation of at least one stack of battery plates;
    b) selecting one stack of battery plates for loading into the apparatus;
    c) pivoting the arm to move the work surface to the substantially horizontal position or the substantially vertical position depending on the detected orientation of the selected stack; and,
    d) loading the selected stack into the apparatus.

The at least one stack of battery plates can be provided on a pallet. At least the position and/or orientation of the at least one stack of battery plates can be detected by a sensor, such as a three dimensional imaging camera, located on a robot head arrangement. The pallet can contain a plurality of stacks.

Step a) can also include:
    sending the sensor readings to a control module, where the data may be downloaded and the orientation of each stack noted and displayed on a screen;
    analysing the sensor readings to determine the orientation of each stack;
    determining whether the pivotable arm must move the work surface to the substantially vertical position or the substantially horizontal position in order to receive the selected stack in the desired orientation; and,
    sending an automatic signal from the control module to the battery plate separator apparatus, instructing the pivotable arm to move the work surface to the determined position.

Step b) can further comprise:
    automatically sending a signal from the control module to the pivotable arm, instructing the pivotable arm to move the work surface into the substantially horizontal position, if the selected stack is detected to be in a first orientation; or,
    automatically sending a signal from the control module to the pivotable arm, instructing the pivotable arm to move the work surface into the substantially vertical position, if the selected stack is detected to be in a second orientation.

Step b) can also include moving the robot head arrangement to a first position to pick up a first stack of battery plates from a pallet, then moving the robot head arrangement to a second position to pick up a second stack from the pallet.

Step d) can further comprise the robot head arrangement picking up the selected stack(s) and transferring the selected stack(s) to the loading mechanism. If the work surface is in the substantially vertical position after the selected stack(s) has/have been loaded into the battery plate separator apparatus, then step d) can include instructing the pivotable arm to move the work surface to the substantially horizontal position.

The method can further comprise the step of transferring a separated stack of plates for subsequent processing. The method can include moving stacks of plates to a further processing apparatus, for example a plate enveloping apparatus, using a supply mechanism, such as a conveyor belt. The robot head arrangement can transfer the stacks from the plate separator apparatus to the supply mechanism.

The method can therefore comprise instructing the pivotable arm to move the work surface from the substantially horizontal position after separating the plates to the substantially vertical position, whereby the robot head arrangement can remove the one or more stacks from the battery plate separator apparatus for further processing.

Whilst the invention has been described above, it extends to any inventive combination set out above, or in the following description or drawings.

BRIEF DESCRIPTION OF THE DRAWINGS

Specific embodiments of the invention will now be described in detail by way of example only and with reference to the accompanying drawings in which:

FIG. 3b shows an example of a problem with stack alignment;

DETAILED DESCRIPTION OF EMBODIMENTS

Figure 1:
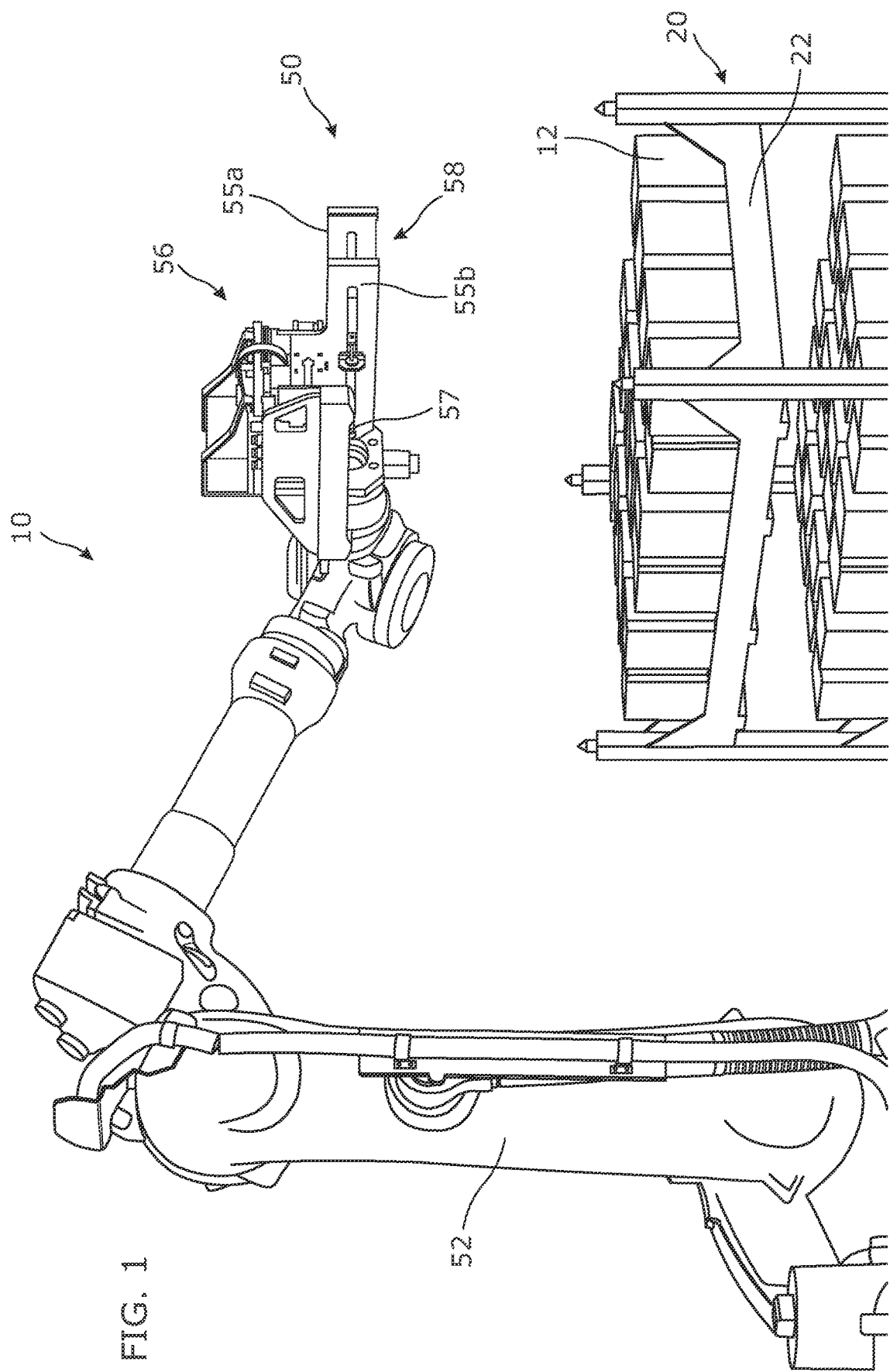
FIG. 1 shows a perspective view of a system for loading battery plates into a battery plate separator apparatus, in accordance with embodiments of the present invention.
Figure 5A:
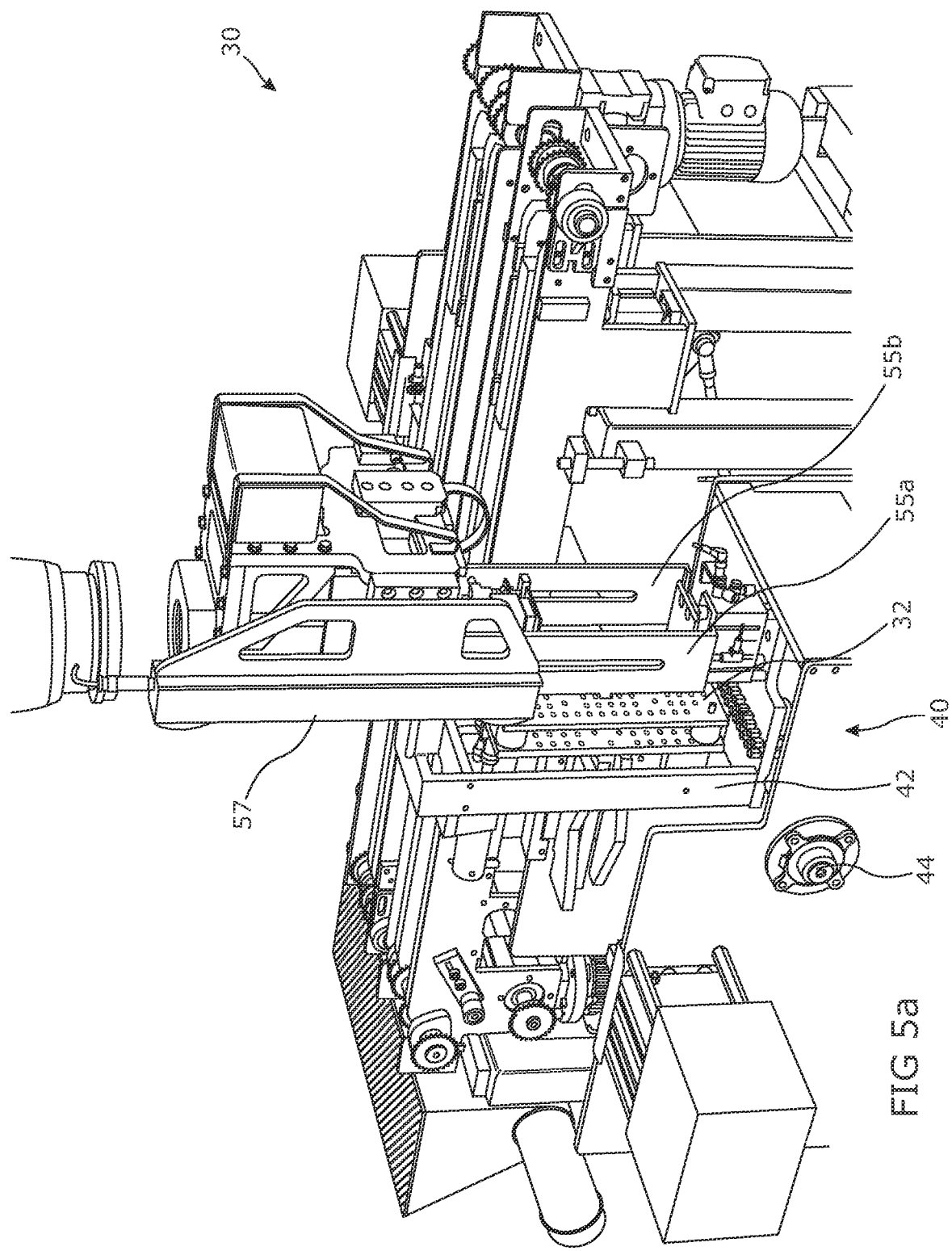
FIG. 5a shows a vertical position of a loading mechanism, configured to receive either the FIG. 4a or FIG. 4b stack; and, FIG. 5b shows a horizontal position of a loading mechanism, configured to receive the other of the FIG. 4a or FIG. 4b stack.

FIG. 1 shows a system 10 configured to load stacks of battery plates 12 into a battery plate separator apparatus 30 (shown in FIGS. 5a and 5b).

FIGS. 5a and 5b show the apparatus 30 in more detail. The apparatus 30 comprises a work surface 32, which is configured to receive the stacks of battery plates 12 in use. Furthermore, the apparatus 30 comprises a loading mechanism 40. The loading mechanism 40 comprises an arm 42 which is coupled to the work surface 32. In use, the arm 42 pivots around an axis 44 to move the work surface 32 between a substantially horizontal (FIG. 5b) and a substantially vertical position (FIG. 5a). In embodiments, the apparatus 30 can comprise two work surfaces, and two loading mechanisms operating simultaneously or sequentially.

Figure 2:
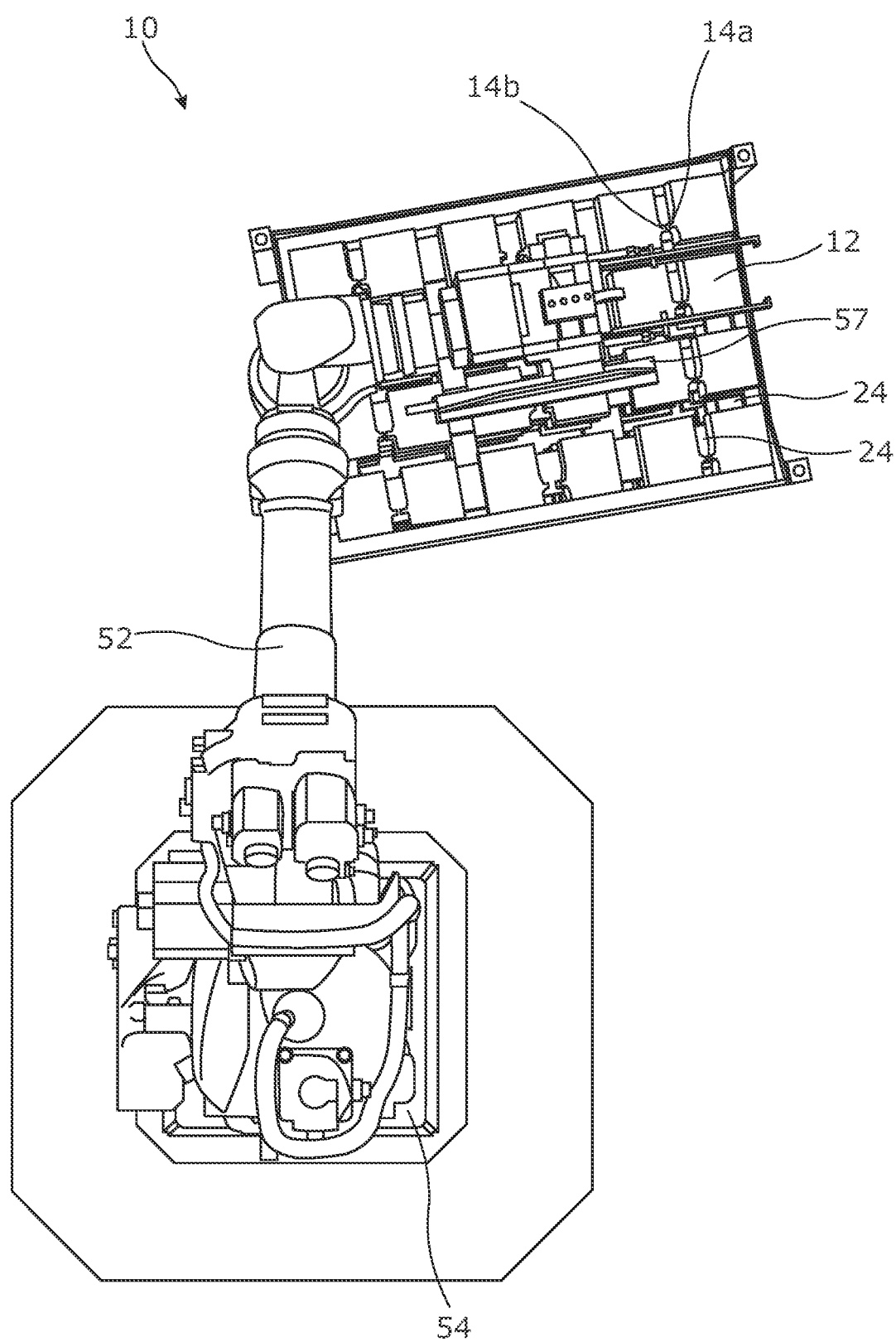
FIG. 2 shows a top view of the FIG. 1 system in use.

Returning to FIG. 1, the system 10 also comprises a stack of pallets 20. Each pallet 20 comprises a surface 22 which in use receives stacks of battery plates 12. The pallet 20 comprises grooves or ribs, for example, which designate positions for each stack. The designated positions ensure there is a pre-defined distance, or gap 24, around each stack, between each stack and the adjacent stack. The gap 24 may be a minimum gap. The stacks of battery plates 12 are arranged in a grid pattern on each pallet surface 22, such that they are arranged in a series of rows and columns. The pallets 20 shown in FIGS. 1 and 2 are configured to hold 24 stacks of battery plates 12, however this can be varied depending on the dimensions of the stacks on the pallet. For example, if the stacks are wider/longer then fewer stacks will fit on the pallet.

Figure 4A:
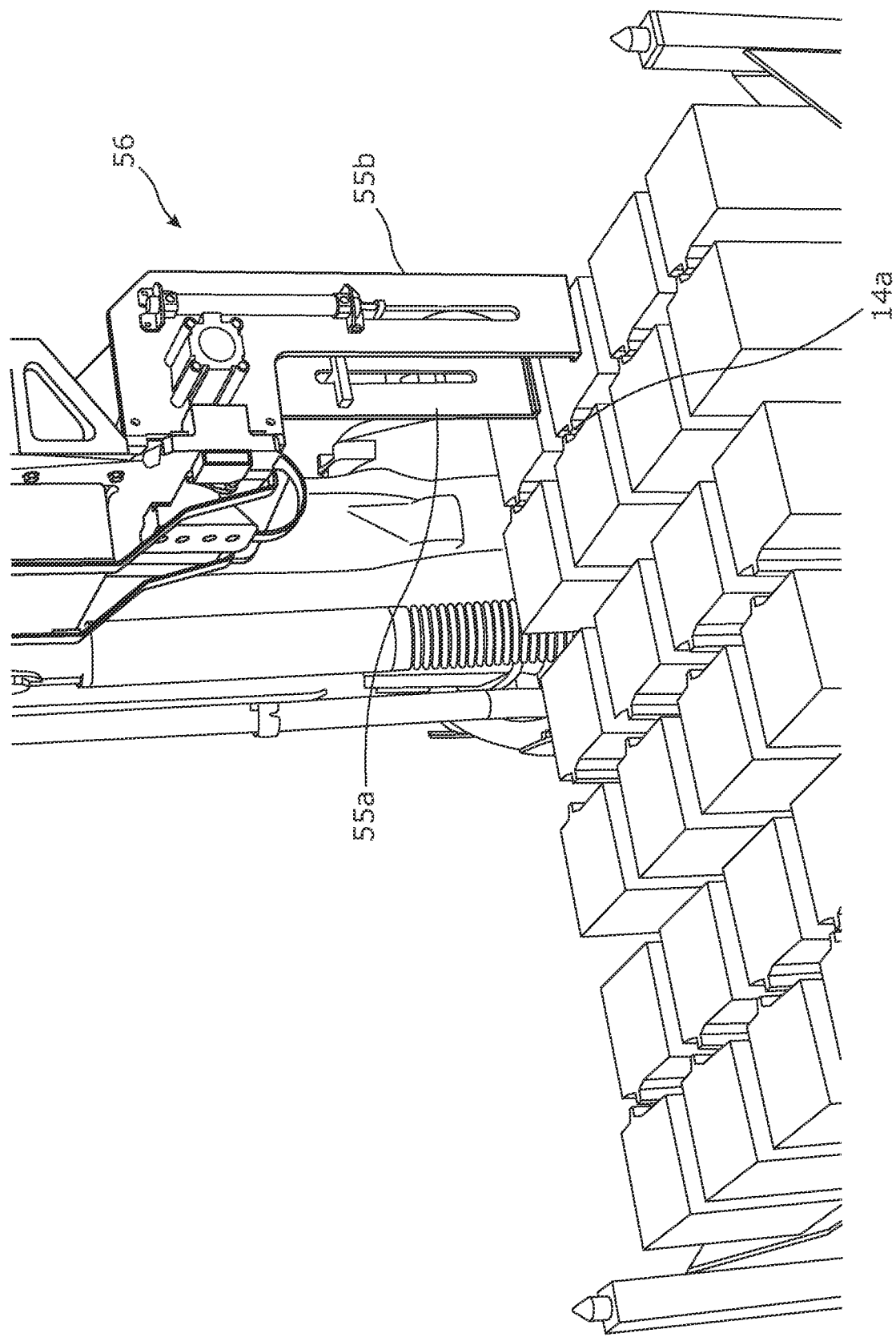
FIG. 4a shows a robot head arrangement arranged to pick up a stack in a first orientation, in accordance with embodiments of the present invention.
Figure 4B:
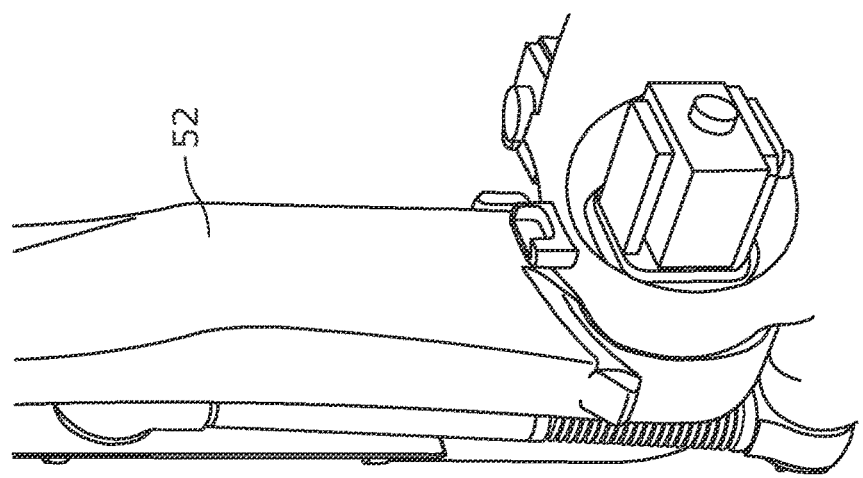
FIG. 4b shows a robot head arrangement arranged to pick up a stack in a second orientation, in accordance with embodiments of the present invention.
Figure 4B:
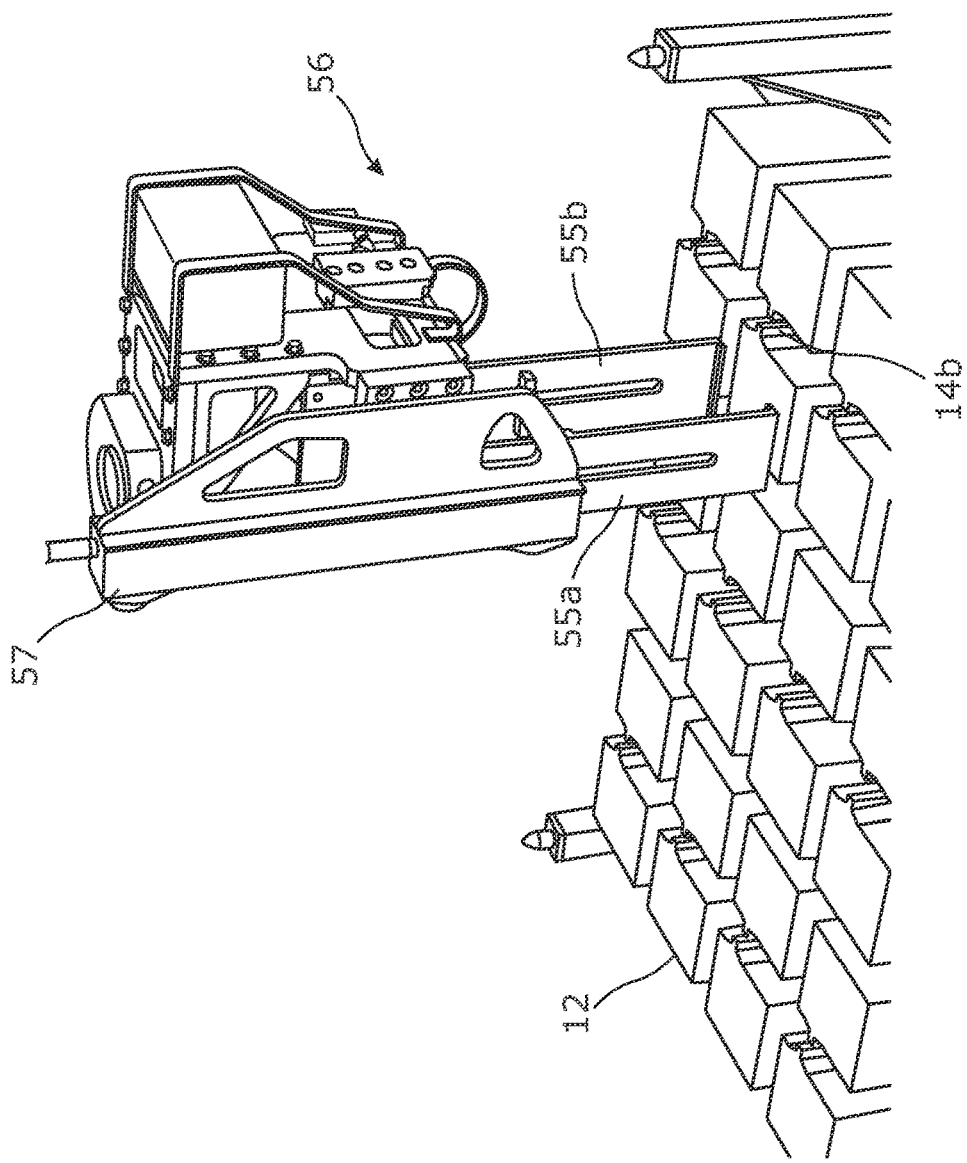

Each stack of battery plates 12 comprises a series of aligned tabs 14a or 14b located on an edge of each stack 12 (best shown in FIGS. 4a and 4b). In use, the location of the tabs 14a or 14b define whether a particular stack 12 is in a first or a second orientation.

The system 10 further comprises a robot head arrangement 50 which in use, transfers each stack of battery plates 12 from the pallet 20 to the loading mechanism 40 of apparatus 30. The robot head arrangement 50 comprises a robot arm 52, which pivots in use around a base 54, and a head 56 which comprises a gripper mechanism 58 configured to pick up a stack of battery plates 12. The robot arm 52 also comprises several "joints" which can be operated manually or automatically to move the head 56 along the x, y, or z axis.

The head 56 comprises a sensor 57, in the form of a three-dimensional imaging camera, which is moved over the top pallet of the stack of pallets 20 in use, such as sequentially along each row or column. The imaging camera 57 is configured to detect at least the orientation and/or position of each stack 12 on the pallet 20 prior to the transfer of each stack 12 to the loading mechanism 40. The gripper mechanism 58 has a pair of elongate and opposed jaws 55a, 55b, and an actuator for displacing at least one of the gripper jaws 55a, 55b towards the opposing jaw 55b, 55a. The gripper mechanism 58 in use picks up a stack 12 by placing the gripper jaws 55a, 55b on either side of the stack 12, within the pre-defined gap 24, and operating the actuator to bring the jaws 55a, 55b together. The gripper mechanism 58 can also place a stack 12 in a desired location by operating the actuator to move the jaws 55a, 55b away from each other.

Figure 3A:
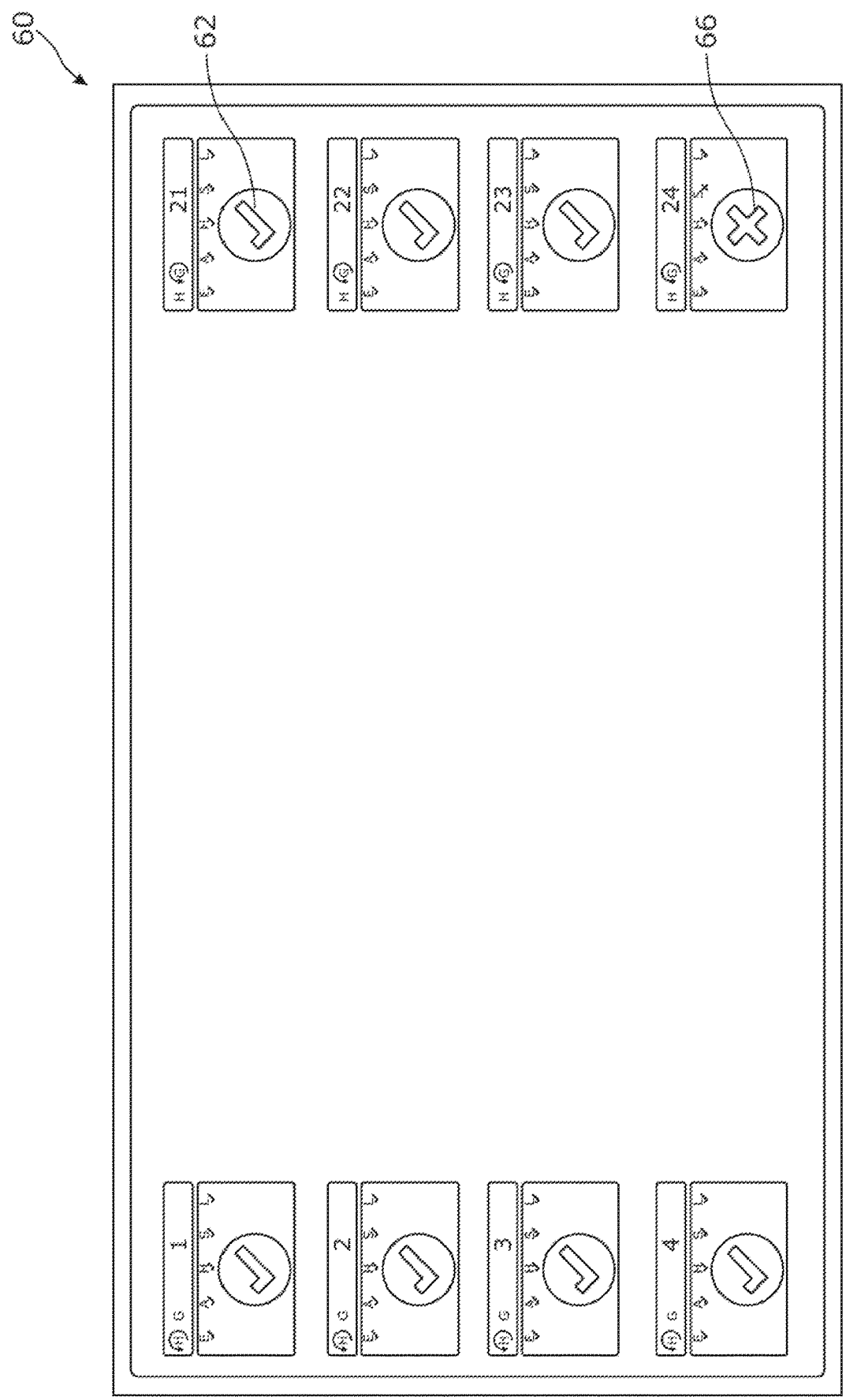
FIG. 3a shows a computer generated graphic which indicates the orientation of battery plate stacks on a pallet, and any potential problems with the alignment of the stacks.

The system 10 further comprises a control module (not shown). After detecting the position/orientation of each stack 12, the imaging camera 57 sends the detected data to the control module. Information about each stack 12 is displayed on a screen 60, as shown in FIG. 3a. In use, the detected orientation of each stack 12, will determine how the stack 12 needs to be loaded into the loading mechanism 40, that is, whether the pivotable arm 42 needs to move the work surface 32 into a substantially vertical or substantially horizontal position to receive the stack 12. In use, the pivotable arm 42 moves the work surface 32 between the substantially horizontal and the substantially vertical positions in response to the detected orientation of a selected stack 12, because different orientations must be loaded into the loading mechanism 40 in a different way to ensure that the tabs 14a, 14b are all aligned in the same orientation. The correct orientation of the tabs 14a, 14b is particularly important after the apparatus 30 has separated the plates in a stack 12, and the stack 12 is then removed and transferred away from the apparatus 30 for further processing.

The pivotability of the arm 42, allows the robot head arrangement 50 to load the stacks 12 into the loading mechanism 40 to either from the top (shown in FIG. 5b), or from the side (shown in FIG. 5a). When top-loading, the pivotable arm 42 moves the work surface 32 into the substantially horizontal position, and the stack 12 is positioned above the work surface 32. When side-loading, the arm 42 moves the work surface 32 into the substantially vertical position, and the stack 12 is positioned next to the work surface 32.

The system 10 also comprises a supply mechanism (not shown) configured to transfer stacks 12 away from the apparatus 30 for subsequent processing. In use, the pivotable arm 42 moves the work surface 32 to the substantially vertical position to allow stacks 12 separated by the apparatus 30 to be unloaded by the robot head arrangement 50 and transferred to the supply mechanism.

In use, a square or rectangular (or any other shape) pallet 20 or stack of pallets 20 is brought into the vicinity of the robot head arrangement 50. The robot arm 52 and head 56 are maneuvered such that the camera 57 is above and parallel to the surface 22 of the pallet 20, and is positioned with reference to a datum point on the pallet 20. The pallets 20 can be any shape, as long as at least one datum point is defined, such that the camera 57 can be positioned with reference to that datum point.

The robot arm 52 is then maneuvered such that the imaging camera 57 is sequentially moved across each row and/or along each column of stacks 12 on the pallet 20. The camera 57 scans/images each stack 12 as it moves. The scanning position of the head 56 and camera 57 is shown in FIG. 2. The camera 57 detects at least the position and/or orientation of each stack 12, and in particular identifies the location of the tabs 14a, 14b, and also measures the gaps 24. The camera 57 then sends a signal to the control module, such as a computer, which analyses the data (such as by a computer algorithm) and determines the orientation of each stack 12. The results of the analysis are displayed on a screen, as shown in FIG. 3a.

Stacks 12 that have the correct alignment will be indicated on the computer graphic 60 by a confirmatory mark, such as a tick 62. If any of the stacks 12 are misaligned, such as if one stack 12 is too close to another stack 12 such that the gripper jaws 55a, 55b cannot fit in the gap 24 between the stacks 12, as shown in FIG. 3b, then the camera 57 will detect this and the problematic stacks 64 will be indicated on the computer graphic 60 with a negative mark, such as a cross 66 (as shown in FIG. 3a, bottom right graphic). At this point, an operator can pause the process and intervene to correct the alignment of the misaligned stacks 64. Alternatively, these stacks 64 can be discarded.

The computer graphic 60 also gives each stack 12, 64 a number, which increases sequentially across the rows/columns, and indicates the order in which the stacks 12 are to be picked up by the head 56 and loaded into the loading mechanism 40.

The computer then chooses the first stack 12 to load into the apparatus 30, bypassing any stacks 64 to be discarded. A signal is sent to the control module, with information regarding the orientation of the stack 12. The control module then sends a signal to the apparatus 30, instructing the pivotable arm 42 to move the work surface 32 into the substantially vertical or substantially horizontal position, depending on the orientation of the stack 12.

For example, if the camera 57 detects that the selected stack 12 is in the first orientation (based on the location of the tabs), as shown for example by the stack about to be picked up in FIG. 4a, then the control module automatically sends a signal instructing the pivotable arm 42 to move the work surface 32 to the substantially horizontal position, shown in FIG. 5b. Alternatively, if the camera 57 detects that the selected stack 12 is in the second orientation (based on the location of the tabs), as shown for example by the stack about to be picked up in FIG. 4b, then the control module automatically sends a signal instructing the pivotable arm 42 to move the work surface 32 to the substantially vertical position, as shown in FIG. 5a. The combinations of tab orientations and loading mechanism positions can vary depending on the desired output stack orientation from the apparatus 30.

The gripper mechanism 58 is then maneuvered into position to pick up the selected stack 12, as shown in FIGS. 4a and 4b. The gripper mechanism 58 can be directed to the correct location using the datum point(s) on the pallet 20 as reference (for example, corner posts). When the gripper mechanism 58 is maneuvered into position, the camera 57 is perpendicular to the pallet surface 22, and the gripper jaws 55a, 55b can slot in the gap 24 surrounding the chosen stack 12.

Once in position, the actuator is operated to bring the gripper jaws 55a, 55b together to close around and grip the stack 12. The separation of the gripping members 55a, 55b when brought together by the actuator can be programmed as necessary depending on the size of stack to be processed.

The robot head 56 and robot arm 52 are then maneuvered such that the stack 12 is lifted off the pallet 20, and transferred to the loading mechanism 40, which has already been pivoted into the correct position (vertical or horizontal) to receive the stack 12 (depending on the orientation of the tabs 14a, 14b). If the stack 12 is loaded into the apparatus 30 with the work surface 32 in the substantially vertical position, the arm 42 is then subsequently pivoted to move the work surface 32 from the substantially vertical position to the substantially horizontal position so the plate separating process can begin.

Once the plates in the stack 12 are separated, the stack 12 is then unloaded from the apparatus 30, with the loading mechanism 40 in either the substantially vertical or substantially horizontal positions. The stacks 12 can then be transferred for subsequent processing, such as plate enveloping. The subsequent processing units require the tabs 14a or 14b of each stack 12 to be facing in the same direction. Therefore, the stacks 12 must all be facing in the same orientation when they are removed from the plate separator apparatus 30.

The position of the arm 42, and hence work surface 32, is therefore directly related to and controlled by the detected orientation of each stack 12 on the pallet 20.

While the invention has been described above with reference to one or more embodiments, it will be appreciated that various changes or modifications may be made without departing from the scope of the invention as defined in the appended claims.

The invention claimed is:

1. A battery plate loading system, the system comprising:
    a battery plate separator apparatus, the apparatus comprising:
        a work surface for receiving a stack of battery plates; and,
        a loading mechanism comprising an arm coupled to the work surface; the arm being pivotable around an axis to move the work surface between a substantially horizontal position and a substantially vertical position;
    a pallet comprising at least one surface arranged to receive a plurality of stacks of battery plates, each stack being arranged in at least a first or a second orientation; and, a robot head arrangement configured to transfer stacks of battery plates from the pallet to the battery plate separator apparatus;

wherein the robot head arrangement comprises a sensor configured to detect the orientation of each stack on the pallet prior to the transfer of each stack to the battery plate separator apparatus; and, wherein the pivotable arm is configured to move the work surface to the substantially horizontal position or to the substantially vertical position in response to the detected orientation of a selected stack to be transferred.

2. A system as claimed in claim 1, wherein the sensor is a camera capable of creating a three dimensional image of each stack.

3. A system as claimed in claim 1, wherein each stack of battery plates comprises a plurality of aligned tabs located on an edge of each stack, and wherein the location of the aligned tabs is used to identify the orientation of each stack of battery plates.

4. A system as claimed in claim 1, further comprising a control module, and wherein the sensor readings are sent to the control module for analysis to determine whether the pivotable arm must move the work surface to the substantially vertical position or the substantially horizontal position to receive the selected stack to be transferred.

5. A system as claimed in claim 4, wherein,
if the sensor detects that the selected stack to be transferred is in the first orientation, the control module automatically sends a signal to the pivotable arm which instructs the pivotable arm to move the work surface to the substantially horizontal position; or,
if the sensor detects that the selected stack to be transferred is in the second orientation, the control module automatically sends a signal to the pivotable arm which instructs the pivotable arm to move the work surface to the substantially vertical position.

6. A system as claimed in claim 1, wherein the robot head arrangement is configured to load each stack of battery plates into the battery plate separator apparatus.

7. A system as claimed in claim 1, wherein if the pivotable arm moves the work surface to the substantially vertical position in response to the detected orientation of a selected stack to be transferred, the pivotable arm is then configured to move the work surface from the substantially vertical position to the substantially horizontal position once the robot head arrangement has loaded the stack of battery plates.

8. A system as claimed in claim 1, wherein the battery plate separator apparatus is provided with two loading mechanisms, each loading mechanism being provided with a respective pivotable arm, and being operable sequentially or simultaneously.

9. A system as claimed in claim 1, further comprising a supply mechanism configured to transfer a separated stack of plates for subsequent processing.

10. A method of loading battery plates into a battery plate separator apparatus, the apparatus comprising:
a work surface for receiving a stack of battery plates; and,
a loading mechanism comprising an arm coupled to the work surface; the arm being pivotable around an axis to move the work surface between a substantially horizontal position and a substantially vertical position;
the method comprising:

a) detecting the orientation of at least one stack of battery plates;
b) selecting one stack of battery plates for loading into the apparatus;
c) pivoting the arm to move the work surface to the substantially horizontal position or the substantially vertical position depending on the detected orientation of the selected stack; and,
d) loading the selected stack into the apparatus.

11. A method as claimed in claim 10, wherein the at least one stack of battery plates is provided on a pallet.

12. A method as claimed in claim 10, wherein the orientation of the at least one stack of battery plates is detected by a sensor located on a robot head arrangement.

13. A method as claimed in claim 12, wherein step a) further comprises:
sending the sensor readings to a control module, where the data is downloaded and the orientation of each stack noted and displayed on a screen;
analysing the sensor readings to determine the orientation of each stack;
determining whether the pivotable arm must move the work surface to the substantially vertical position or to the substantially horizontal position in order to receive the selected stack; and,
sending an automatic signal from the control module to the battery plate separator apparatus, instructing the pivotable arm to move the work surface to the determined position.

14. A method as claimed in claim 13, wherein step b) further comprises:
automatically sending a signal from the control module to the pivotable arm, instructing the pivotable arm to move the work surface into the substantially horizontal position, if the selected stack is detected to be in a first orientation; or,
automatically sending a signal from the control module to the pivotable arm, instructing the pivotable arm to move the work surface into the substantially vertical position, if the selected stack is detected to be in a second orientation.

15. A method as claimed in claim 12, wherein the sensor is a camera capable of creating a three dimensional image of each stack.

16. A method as claimed in claim 10, wherein step d) further comprises the or a robot head arrangement picking up the selected stack and transferring the selected stack to the loading mechanism.

17. A method as claimed in claim 16, wherein if the work surface is in the substantially vertical position after the selected stack has been loaded into the battery plate separator apparatus, then instructing the pivotable arm to move the work surface to the substantially horizontal position.

18. A method as claimed in claim 10, further comprising the step of transferring a separated stack of plates for further processing.

19. A method as claimed in claim 18, wherein the method further comprises instructing the pivotable arm to move the work surface from the substantially horizontal position after separating the plates to the substantially vertical position, whereby one or more stacks are removed from the battery plate separator apparatus for further processing.

* * * * *